United States Patent Office 3,609,931
Patented Oct. 5, 1971

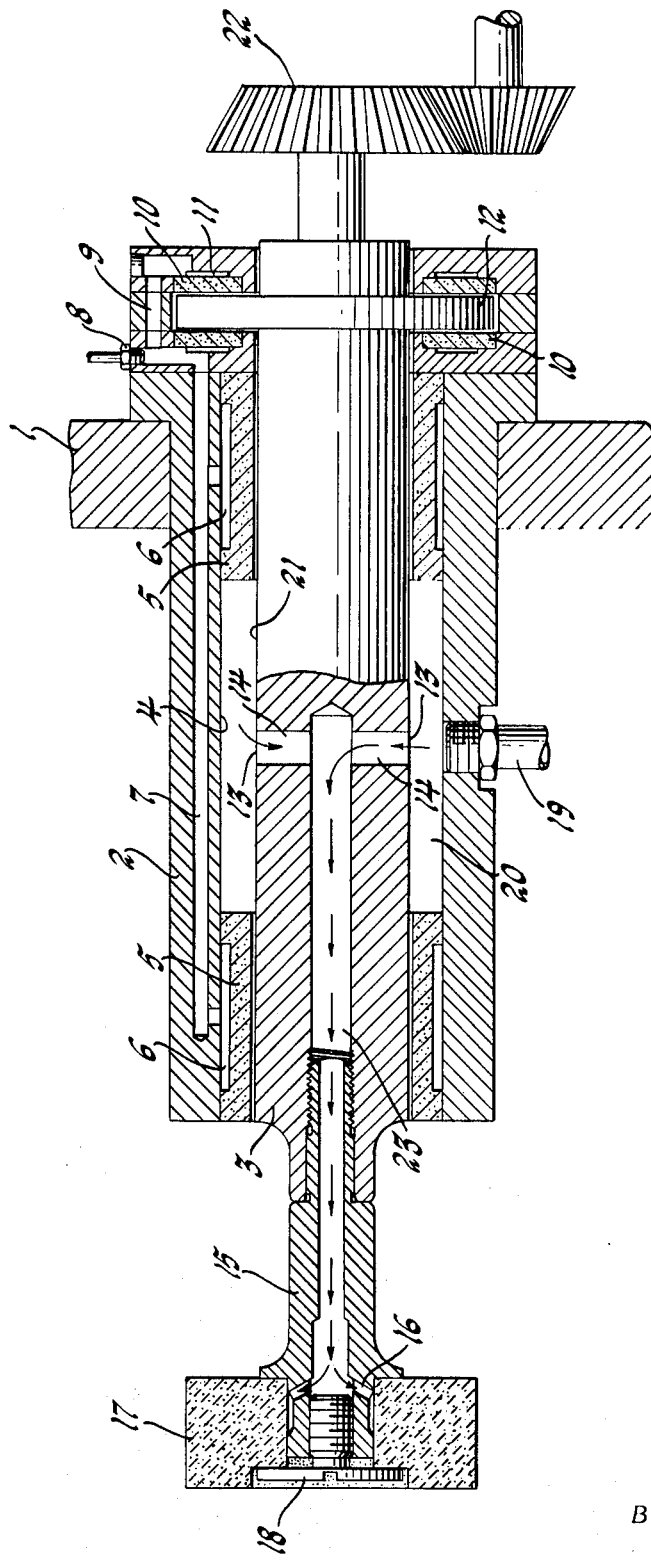

3,609,931
COOLANT SYSTEM FOR HIGH SPEED SPINDLES
Donald A. Voorhies, Wauwatosa, Wis., assignor to
General Motors Corporation, Detroit, Mich.
Filed Feb. 16, 1970, Ser. No. 11,521
Int. Cl. B24b 55/02
U.S. Cl. 51—267                                4 Claims

ABSTRACT OF THE DISCLOSURE

An abrasive wheel spindle is supported in a pair of spaced externally pressurized gas bearings mounted in the spindle housing. The gas bearings also provide a sealing function for a transition chamber for delivering coolant to a conduit in the rotating spindle.

---

My invention relates generally to machine tools and more specifically to machine tools in which liquid coolant is fed to the tool through a rotating spindle.

In such types of tools, a significant problem is that of delivering the liquid coolant from a stationary source to the rotating spindle without excessive leakage which contributes both to quantity and pressure loss of the coolant. In the past, this transition in the fluid circuit has generally been accomplished by a slip joint in a fluid conduit which is difficult to seal.

My invention is concerned with the aforementioned problem in a high speed environment such as is found in abrasive type machining operations. Through the use of externally pressurized gas bearings which also function as seals not only is the sealing problem associated with the transition of the coolant fluid from its stationary sources to the rotating shaft simplified but also the very low friction characteristics of the bearings allow for increased spindle speeds.

An excellent application of my invention is in connection with a porous abrasive wheel such as is disclosed in U.S.S.N. 850,314 filed July 31, 1969 in the name of Harold W. Ferchland for an Abrasive Cutting Tool and assigned to the assignee of the present invention. The aforementioned tool is adapted to flow a high volume of coolant radially through the wheel and the coolant may be fed through the spindle.

The exact nature of my invention as well as its objects and advantages will be readily apparent from consideration of the following specification relating to the annexed drawing which shows an axial section taken through a portion of a machine tool incorporating my invention.

Referring now to the drawing, a vertical wall 1 of a machine tool is used to support a housing 2 in which is rotatably mounted a spindle 3. More specifically, the housing 2 has a bore 4 into which is mounted a pair of spaced permeable sleeves 5. The outer periphery of each of the sleeves 5 is grooved forming plenums 6 with the bore 4. A passage 7 in the housing 2 leads from a fitting 8 to each of the plenums 6. The fitting 8 is connected to a pressurized gas source, usually air (not shown). A branch 9 of the passage 7 leads through annular plenums 11 to the back faces of a pair of permeable washers 10 mounted at the right-hand end of the housing 2 as shown in the drawing. The spindle 3 includes a collar 12 disposed between and spaced a small distance from the confronting faces on the permeable washers 10.

Ports 13 on the periphery of the midportion of the spindle are inlets for radial conduits 14 leading to a central conduit 23 on the axis of the spindle 3. A hollow chuck 15 is threaded to the left-hand end of the spindle 3 with its axial bore continuous with the conduit 23. A number of generally radial passages 16 lead from the axial bore of the chuck 15 to its periphery. A porous abrasive wheel 17 such as the one disposed in the aforementioned Ferchland patent application is secured to the chuck 15 by nut 18. A fitting 19 in the housing 2 supplies liquid coolant from a source (not shown) to a chamber 20 formed by the midportions of the bore 4 and the periphery 21 of the spindle 3 and sealed by the porous sleeves 5 as will hereinafter be more fully explained. The spindle is rotated by any suitable power source, for example, by an electric motor (not shown) through a bevel reduction gear set 22.

The operation of the machine tool spindle is as follows. Air under pressure, for instance, is supplied to the passage 7 and its branch 9 from an external source through fitting 8. The pressurized air permeates the washers 10 and provides air bearings on either side of the collar 12 to center it between the washers and thereby axially locate the spindle 3 within the housing 2. The air also permeates the permeable sleeves 5 and flows into the small clearance space between the inner circumference of these sleeves and the confronting cylindrical portions on the spindle 3 thus forming radial "air bearings." A similar type bearing is disclosed in my prior Pat. 3,374,039 entitled Antifriction Bearing and assigned to the assignee of this present invention. For a more detailed description of the operation of such a bearing, reference may be made to the aforementioned patent. As discussed in that patent, the air flows axially out the ends of the bearing. The flow in the inboard direction also provides a seal for the chamber 20 preventing escape of or pressure loss in the liquid coolant in the chamber 20 which provides the transition for the flow of the liquid coolant from its stationary source to the coolant-feed passages 14 and 23 in the rotation spindle 3. This coolant upon reaching the passages 16 is directed generally radially onto the inner circumference of the abrasive wheel 17 from whence it is delivered to the outer circumferential working surface aided by the influence of the centrifugal force. For a further description of a suitable abrasive wheel 17, reference can be had to the aforementioned Ferchland patent application.

Having thus described the invention, what is claimed is:
1. The combination comprising:
   a housing having a bore,
   a pair of spaced, externally pressurized gas bearings mounted in said bore,
   a rotatable spindle disposed in said pair of gas bearings with spaced peripheral bearing portions spaced closely adjacent said pair of gas bearings respectively said spindle having a chuck portion projecting beyond said housing,
   a porous abrasive wheel mounted on said chuck,
   a liquid coolant chamber bounded by said bore and the peripheral portion of said spindle between said spaced peripheral bearing portions,
   means to connect said chamber to a source of pressurized liquid coolant,
   first passage means in said spindle having an inlet opening into said chamber and an outlet approximate a peripheral surface of said porous abrasive wheel,
   second passage means in said housing leading to said gas bearings, and
   means to connect said second passage means to a source of pressurized gas whereby said gas bearings rotatably support said spindle and seal said chamber when connected to said pressurized gas source to provide a substantially fluid tight passage for liquid coolant to flow to a peripheral surface of said abrasive wheel through said spindle from a source external of said housing.
2. In a machine, the combination comprising,
   a stationary support having a cylindrical surface,
   a pair of spaced permeable sleeves mounted on said cylindrical surface, each of said sleeves forming a plenum with said cylindrical surface, gas passage means in said support opening into each of said plenums, means to connect said first passage means to a source of pressurized gas whereby gas permeates through said sleeves to the circumferential surface of each of said sleeves remote from said plenum when said first passage means is connected to a source of pressurized gas, a rotatable member having spaced cylindrical bearing portions spaced closely adjacent said circumferential surfaces, respectively, chuck means on said rotatable member, a tool mounted on said chuck means, liquid coolant passage means leading from said tool through said rotatable member and opening onto the periphery of said rotatable member between said spaced cylindrical bearing portions, and means to feed liquid coolant to said cylindrical surface of said support at a point between said permeable sleeves whereby permeation of gas through said sleeves substantially confines the flow of liquid coolant between said porous sleeves as cooling liquid is delivered from said stationary support to said rotatable member.

3. In a machine, the combination comprising, a housing having a bore, a liquid coolant inlet in said housing opening into said bore, a pair of aligned, permeable sleeves mounted in said bore on either side of said liquid coolant inlet, a rotatable spindle disposed in said housing and having spaced cylindrical bearing surfaces confronting said permeable sleeves with a small clearance therebetween, respectively, means to axially locate said spindle in said housing with a portion of said spindle projecting out of said housing, chuck means on said projecting portion, conduit means in said spindle having an inlet located between said permeable sleeves, and an outlet in the periphery of said chuck means, and passage means in said housing opening onto the exterior surface of said permeable sleeves, means to connect said passage means to a source of pressurized gas whereby said permeable sleeves are adapted to rotatably support said spindle on a cushion of gas and to seal the space within said bore interior of said sleeves to provide a substantially fluid tight conduit between said stationary housing and said rotatable spindle whereby coolant may be fed from a source external of said spindle to said chuck means through said spindle without substantial loss while said spindle is rotating.

4. The combination as defined in claim 3 further including an annular, porous abrasive wheel mounted on said chuck means and wherein said outlet directs liquid coolant generally radially onto the inner annular surface of said abrasive wheel, said liquid coolant flowing to the outer annular surface of said abrasive wheel under the influence of centrifugal force when said spindle is rotated.

References Cited

UNITED STATES PATENTS

| | | | |
|---|---|---|---|
| 2,946,244 | 7/1960 | Maynard | 51—267 |
| 3,229,427 | 1/1966 | Goodhew | 51—267 |
| 3,374,039 | 3/1968 | Voorhies | 308—107 |

WILLIAM R. ARMSTRONG, Primary Examiner

U.S. Cl. X.R.

51—134.5; 308—107